United States Patent [19]

Maracchi

[11] Patent Number: 5,535,777
[45] Date of Patent: Jul. 16, 1996

[54] GAS FLOW SAFETY ASSEMBLY

[76] Inventor: Giorgio Maracchi, Apartado No. 1313 Maracaibo, Edo., Zulia, Venezuela

[21] Appl. No.: 529,032

[22] Filed: Sep. 15, 1995

[51] Int. Cl.$^6$ .................. F16K 17/164; F16K 17/168
[52] U.S. Cl. .................. 137/458; 137/456; 137/495; 137/556; 251/65; 251/243
[58] Field of Search .................. 137/458, 456, 137/495, 556; 251/65, 243

[56] References Cited

U.S. PATENT DOCUMENTS

| | | | |
|---|---|---|---|
| 324,905 | 8/1885 | Westinghouse | 137/456 X |
| 3,587,628 | 6/1971 | Farrer | 137/456 |
| 4,817,664 | 4/1989 | Chang | 137/458 |

FOREIGN PATENT DOCUMENTS

| | | | |
|---|---|---|---|
| 2271477 | 5/1974 | France | 137/458 |
| 644629 | 10/1950 | United Kingdom | 137/456 |
| 650351 | 2/1951 | United Kingdom | 137/456 |

*Primary Examiner*—Stephen M. Hepperle
*Attorney, Agent, or Firm*—Malloy & Malloy

[57] ABSTRACT

A gas flow safety valve assembly having a main housing of generally solid rigid construction with a main interior chamber divided into an upper compartment and a flow through compartment by a primary diaphragm. Further, the main housing includes an inlet passage leading into the flow through compartment and an outlet passage leading out of the flow through compartment. Upon a gas flow pressure within the flow through compartment dropping below a predetermined minimum acceptable gas flow rate, the primary diaphragm is downwardly displaced resulting in the engagement of a primary displacement member connected thereto with a lever element pivotally positioned within the main housing. The lever element which has a contact plate that engages a magnetic element disposed in the main housing is movable between a shut off orientation and a flow through orientation, the shut off orientation resulting in a blockage of gas flow through the outlet passage until the assembly is reset and the lever element is held in its flow through orientation by a lever biasing element that is sufficiently strong to maintain the lever element in its flow through orientation unless it is affirmatively urged into its shut off orientation, such as by the primary lever misplacement member.

14 Claims, 1 Drawing Sheet

GAS FLOW SAFETY ASSEMBLY

BACKGROUND OF THE INVENTION

1. Field of the Invention

The present invention relates to a gas flow safety assembly to be connected in line between a main gas distribution line and an internal distribution system of a particular facility being supplied so as to provide a safe, secure and efficient manner of ensuring that gas flow, during overpressure or underpressure flow situations, is not maintained to the internal distribution system, while also ensuring that gas flow will be re-initiated to the internal distribution system only when the gas flow pressure has been returned to an acceptable/normal level and when affirmative steps are taken to reset the gas flow subsequent to the determination that a safe operating conditions has been established at the appliance(s) which uses the gas.

2. Description of the Related Art

Generally, most facilities, such as a home or work place, which utilize a gas, such as natural gas, from a general gas supply source are connected at a single point with a main distribution line that is carrying the supply of gas to the facility. Further, because many gas users require different amounts of gas, often at different flow rates or pressures, the gas supply is often provided at maximum levels and is specifically regulated at the single connection with the main distribution line to meet the needs of the user. Once regulated, the pressurized gas is distributed to the various appliances that need it through the internal gas distribution system. Because, however, all of the internal appliances which utilize the gas are essentially connected with one anther, malfunctions or hazardous conditions that affect one appliance will affect all appliances. Also, because the appliances are often located at various points throughout the facility, it is difficult to ensure that al appliances are off, and/or to effect an immediate shut off of gas to all of the appliances as each will generally include their own shut off valve.

Along these lines, an all to frequent occurrence associated with the supply of gas is the temporary shutdown of gas flow by the gas supplier to the consumers. Generally, the flow stoppage becomes necessary due to blockages or ruptures of the main supply line and/or the occurrence of potentially hazardous leaks. Accordingly, when such a shut off is necessary, an underpressure situation wherein insufficient pressure is flowing to the consumer's facility and appliances, or wherein gas pressure is completely discontinued, generally occurs. In these circumstances, the gas consumers are instructed to immediately and completely shutdown all appliances which may utilize the gas and await the return of normal gas pressure before reactivating any of the appliances. Specifically, when the gas provider is seeking to identify the source of a leak or rupture, it necessary to have a completely sealed environment, and the quicker that the closed/sealed environment is achieved, the quicker the leakage or rupture is located. Further, when gas flow supply pressure is reduced individuals utilizing the gas consuming appliances tend to open the gas flow valves at the appliance significantly to check for any gas flow or to increase the permitted gas flow to the appliance and maximize the benefits of the little or no gas pressure they do have. Unfortunately, however, this opening of the valves can be quite hazardous when normal gas flow is reinitiated because a rush of gas can result to the completely opened, lit appliances, resulting in a flash flame, or a significant gas leak can occur through an appliance that has been inadvertently left in a gas flowing orientation.

In addition to the dangerous conditions that an underpressure situation provides to the consumer, those situations also result in a great expense to the gas company who is aware of those dangers. In fact, in most circumstances wherein the gas company must shut down gas flow, even temporarily, an extensive and time consuming check of individual facilities must be performed to ensure that all appliances in those facilities are turned off and that the gas flow to those appliances is maintained off until normal gas pressure is restored.

Additionally, in circumstances where there is a gas flow malfunction in the main service line, where some of the internal appliances or the internal distribution system of the facility are malfunctioning, or when the venting systems of the gas distribution system are malfunctioning, an overpressure flow situation can easily occur. In particular, overpressure situations generally involve a substantially increased pressure flow burst or buildup. Not only is this pressure burst/buildup wasteful, as far as gas which is lost and unused, but it can also create a serious hazard when specific appliances are turned on and ignited expecting only normal gas flows.

Accordingly, it would be highly beneficial to provide a safety assembly which will immediately and automatically terminate gas flow into the internal distribution system of a facility, and hence into each of the appliances located therein, upon a gas flow pressure drop below minimum acceptable levels or above maximum acceptable levels, and which requires specific, affirmative user resetting in order to reinitiate the flow of gas. Further, it would be beneficial to ensure that gas flow in an underpressure situation be re-initiated or reset only when the gas flow pressure has increase back to normal levels, and that gas flow in an over pressure situation be re-initiated or reset only when the system is returned to a normal pressures state, but also when there is sufficient gas flow pressure so as to not be too low. Finally, it would beneficial to provide a safety device which permits for quick and immediate shut down of gas flow to a facility without extensive manipulation, and actuation of various valves and controllers, while ensuring that gas flow is reinitiated only when appropriate operating conditions are reattained.

SUMMARY OF THE INVENTION

The present invention relates to a gas flow safety valve assembly to be connected in line between a main gas distribution line and an internal gas distribution system at a particular use facility. The safety valve assembly itself includes primarily a main housing having a main interior chamber and formed from a generally solid, rigid construction.

Disposed generally within the main interior chamber of the main housing are primary flow detection means. The primary flow detection means are specifically structured and disposed to detect a gas flow pressure through the main interior chamber of the main housing. Further, the primary flow detection means include a primary diaphragm disposed in the main interior chamber so as to define a flow through compartment and an upper compartment in the main interior chamber.

Extending into the flow through compartment of the main interior chamber is an inlet passage. The inlet passage extends from an exterior inlet port formed in an exterior of the main housing to an interior inlet port which provides access to the flow through compartment. Similarly, an outlet passage is included in the main housing and extends between an exterior outlet port formed in the exterior of the main housing to an interior outlet port leading to the flow through compartment of the main interior chamber.

Pivotally disposed within the flow through compartment of the main interior chamber is a lever element. The lever element includes a first end and a second end and is hingedly secured to the main housing, generally near the interior outlet port formed therein, at the first end.

Also disposed in the main housing, preferably near the interior inlet port, is a magnetic element. The magnetic element is positioned in underlying relation beneath the lever arm, more particularly in underlying relation to a contact plate of the lever element. Specifically, the contact plate is included with the lever element and is disposed generally at a second end of the lever element so as to selectively secure the second end of the lever element with the magnetic element. Along these lines, the lever element includes a shut off orientation and a flow through orientation defined by the position of the contact plate, and hence the second end of the lever element, relative to the magnetic element. In particular, the shut off orientation includes the contact plate securely engaged with the magnetic element, while the flow through orientation includes the contact plate disposed in spaced apart relation from the magnetic element.

Disposed in the main housing so as to extend into the flow through compartment of the main housing is a lever biasing element. The lever biasing element is structured to engage the lever element and maintain it normally in the flow through orientation unless overcome by the magnetic engagement of the contact plate with the magnetic element.

Further included in the lever element of the present invention are stopper means. Specifically, the stopper means are structured to cover the interior outlet port, and prevent flow therethrough, upon the lever element being disposed in its shut off orientation, and to expose the interior outlet port upon the lever element being disposed in its flow through orientation.

In order to achieve positioning of the lever element between its flow through orientation and shut off orientation, the primary flow detection means further include primary biasing means. The primary biasing means are connected with the primary diaphragm and are movable between a compressed orientation and a relaxed orientation. In use, the primary biasing means are structured and disposed to be urged into and maintained in a compressed orientation upon the gas pressure within the flow through compartment of the main housing being at or above a predetermined minimum acceptable gas flow pressure so as to urge the primary diaphragm towards the upper compartment of the main housing. Adhesional, extending into the flow through compartment and connected with the primary diaphragm is a primary lever displacement member. The primary lever displacement member is structured to engage the lever element when the biasing means move into their relaxed orientation due to the gas pressure within the flow through compartment of the main housing dropping below the predetermined minimum acceptable gas flow pressure. As a result, the primary displacement member will overcome the resistive force of the lever biasing element and urge the lever element into its shut off orientation wherein the contact plate is securely engaged with the magnetic element and the stopper means are accordingly disposed in covering relation atop the interior outlet port.

Finally, the gas flow safety valve assembly of the present invention further includes reset means. The reset means are specifically structured and disposed to separate the contact plate of the lever element from the magnetic element, thereby positioning the lever element in the flow through orientation and permitting the lever biasing element to maintain the lever element in the flow through orientation, if the gas pressure within the flow through compartment of the main housing is at or above the predetermined minimum acceptable gas flow pressure.

It is an object of the present invention to provide a gas flow safety valve assembly which will immediately interrupt the flow of gas upon a gas flow pressure dropping below a minimum acceptable gas flow pressure.

Another object of the present invention is to provide a gas flow safety valve assembly which is structured to immediately interrupt the flow of gas upon a gas flow pressure rising above a predetermined maximum acceptable gas flow pressure.

Also an object of the present invention is to provide a gas flow safety valve assembly which immediately shuts off gas flow if acceptable conditions are not maintained, and which requires affirmative resetting to reinitiate any gas flow once acceptable gas flow pressure levels have been detected.

An object of the present invention is to provide an inexpensive and easily to install and implement gas flow safety valve assembly which prevents gas underpressure and/or overpressure situations and the hazards associated therewith.

Still another object of the present invention is to provide gas flow safety valve assembly which can permit immediate and totally effective shut off of gas flow in a convenient and easy to implement manner.

A further object of the present invention is to provide a gas flow safety valve assembly which provides a visible indicator of appropriate operating conditions.

Another object of the present invention is to provide a gas flow safety valve assembly which provides visible indication of overpressure or underpressure gas flow situations.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
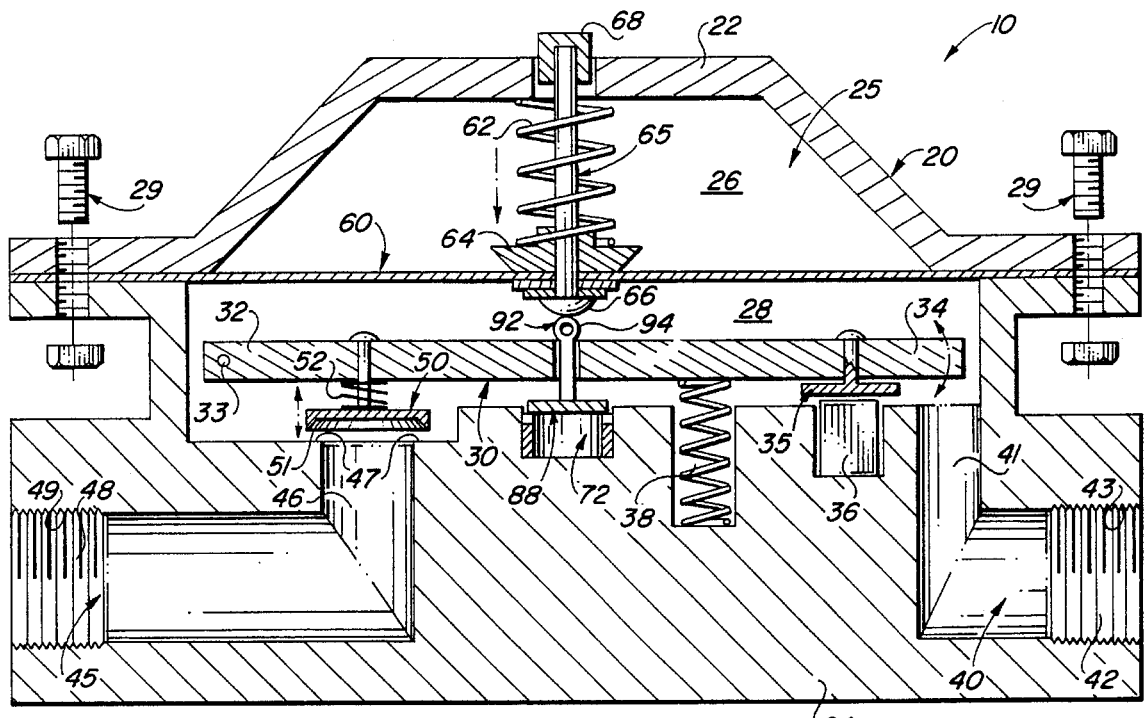
FIG. 1 is front cross sectional view of the gas flow safety valve assembly of the present invention.

Shown throughout the Figures, the present invention is directed towards a gas flow safety valve assembly, generally indicated as 10. The gas flow safety valve assembly 10 is especially structured to be connected in line between the main gas supply line, which normally supplies gas to a specific area and/or facility, and an internal gas distribution system which distributes the gas to the appliances within the specific facility being supplied.

The gas flow safety valve assembly 10 includes primarily a main housing 20. This main housing 20, which is formed of a generally solid, rigid construction, such as of steel, aluminum, or even a strong plastic material, includes therein a main interior chamber 25. Preferably, the main interior chamber 25 of the main housing 20 is defined by a lid portion 22 which rests atop a base portion 24 of the main housing 20. As such, the lid portion 22 may be removed to permit facilitated access to the main interior chamber 25 when necessary.

Disposed within the main interior chamber 25 of the main housing 20 are primary flow detection means. Specifically the primary flow detection means are structured and disposed to detect a gas flow pressure through the main interior chamber 25 of the main housing 20, thereby determining if an unacceptable or hazardous pressure condition is present. Included as part of the primary flow detection means is a primary diaphragm 60. The primary diaphragm 60, which is preferably formed of a strong, flexible material panel, is preferably secured between the top and bottom portions 22 and 24 of the main housing 20, such as through the securing bolts 29 that secure the portions to one another. Accordingly, the primary diaphragm 60 is maintained in a generally taught, yet flexible orientation that is movably responsive to pressure variations acting thereon. Further, the primary diaphragm 60 functions to divide the main interior chamber 25 of the main housing 20 into an upper compartment 26 and a flow through compartment 28 through which the gas being supplied actually flows.

Returning to the main housing 20 of the gas flow safety valve assembly 10, it includes an inlet passage 40 formed preferably in the bottom portion 24 thereof. The inlet passage 40 extends from an exterior inlet port 42, formed in an exterior of the main housings 20, to an interior inlet port 41. Specifically, the inlet port 41 leads to the flow through compartment 28 of the main interior chamber 25, while the exterior inlet port 42 is connected, preferably by a threaded perimeter 43 thereof with a main supply conduit. Additionally, disposed in the main housing 20 is an outlet passage 45. The outlet passage 45 is preferably disposed a spaced apart distance from the inlet passage 40 within the bottom portion 24 of the main housing 20. Similarly, the outlet passage 45 includes an interior outlet port 48, formed in the exterior of the main housing 20, and an interior outlet port 46, which leads to the flow through compartment 28 of the main interior chamber 25. The exterior outlet port 48, preferably through a perimeter threading 49 thereof, is therefore secured to a flow through conduit leading to the internal gas distribution system of the facility being supplied with gas.

Movably disposed in the flow through compartment 28 of the main housing 20 is a lever element 30. The lever element 30, which is preferably an elongate, generally rigid bar or plank type segment, includes a first end 32 and second end 34 spanned by a mid portion. The first end 32 of the lever element 30 is hingedly secured to the main housing 20, generally near the interior outlet port 46. Preferably, the first end 32 is hingedly secured by a pivot member 33 which extends transversely therethrough to provide a pivot axis for the lever element 30. Alternatively, however, a hinge or other securing means which permit a pivoting movement of the second end 34 of the lever element 30 relative to the first end 32 of the lever element 30 may be equivalently employed.

The lever element 30 further includes a contact plate 35, preferably disposed at or near the second end 34 thereof. The contact plate 35 is a magnetically attractive, preferably metallic segment secured to an underside of the lever element 30, such as through an adhesive, a screw, or a rivet, as illustrated in the preferred embodiment. The contact plate 35 is structured and disposed to overlie a magnetic element 36 positioned in the main housing 20, preferably near the interior inlet port 41. As such, the naturally attractive forces between the contact plate 35 and the magnetic element 36, as well as the relative spacing therebetween function to selectively position the lever element 30 between a shut off orientation and a flow through orientation. In particular, the shut off orientation is defined by the contact plate 35 being securely engaged with the magnetic element 36, while the flow through orientation is defined by the contact plate 35 being disposed in a spaced apart relation from the magnetic element 36. Further, it should be noted that both the contact plate 35 and the magnetic element 36 may have attractive magnetic properties or may interchangeably include an attractive magnetic element and a metallic plate, all of which are within the contemplated scope of the present invention as claimed, and would be equally effective to selectively maintain the lever element 30 in the shut off orientation.

Additionally disposed within the main housing 20, and extending into the flow through compartment 28 of the main housing 20 is a lever biasing element 38. The lever biasing element 38, which is preferably a coiled spring disposed in a recess in the bottom portion of the main housing 20, is structured and disposed to engage preferably an underside of the lever element 30. Specifically, the lever biasing element 38 is structured to normally maintain the lever element 30 in the flow through orientation wherein the contact plate 35 is spaced apart from the magnetic element 36. Still, however, the lever biasing element 28 while being strong enough to overcome the magnetic attraction between the contact plate 35 and the magnetic element 36, when they are disposed in spaced apart relation from one another, and thereby maintain the contact plate 35 spaced apart from the magnetic element 36, must also be sufficiently compressible such that when the contact plate 35 is pushed close enough, or into contacting relation with the magnetic element 36, the strength of the lever biasing element 38 alone is insufficient to urge the lever element 30 out of its shut off orientation.

Also included in the lever element 30, preferably in overlying relation to the interior outlet port 46, are stopper means, generally indicated as 50. The stopper means 50 are specifically structured to cover the interior outlet port 26 and prevent gas flow therethrough upon the lever element 30 being disposed in the shut off orientation. Conversely, when the lever element 30 is disposed in the flow through orientation the stopper means 50 are structured to expose the interior outlet port 46 and permit normal gas flow therethrough. In the preferred embodiment, the stopper means 50 will preferably include a stopper element 51 which will securely engage the interior outlet port 46 about a perimeter thereof. Further, as illustrated in the Figures, the interior outlet port 46 will preferably have an upwardly extending lid 47 disposed about a perimeter thereof, and as such, the stopper element 51 will have a corresponding downwardly depending lip which provides for appropriate mating engagement between the stopper element 51 and the interior outlet port 46. Also, the stopper element 51 may include a gasket or other resilient type sealer element to further provide an air tight seal between the stopper element 51 and in the interior outlet port 46 when the lever element 30 is disposed in the shut off orientation. Finally, so as to further maintain a fluid impervious seal between the stopper element 51 and the interior outlet port 46, a biasing spring 52 may preferably be included. In use, when the lever element 30 is moved into its shut off orientation, the stopper element 51 will engage the interior outlet port 46, prior to the lever element 30 fully reaching its shut of orientation, thereby compressing the biasing spring 52. As such, the natural tendencies of the biasing spring 52 will function to push down the stopper element 51 to provide an increased seal. It should be noted, however, that the biasing spring 52 should not be of sufficient strength so as to disengage the lever element 30 from its shut off orientation, either independently or in combination with the lever biasing element 38.

As previously recited, the primary flow detection means include a primary diaphragm 60 that defines the flow through compartment 28 of the main interior chamber 25. Additionally, the primary flow detection means include primary biasing means, preferably in the form of a biasing spring 62. The primary biasing means 62 are connected with the primary diaphragm 60 and are movable between a compressed orientation and a relaxed orientation. Normally, the primary biasing means 62 tend to urge the primary diaphragm 60 into the flow through compartment 38; however, upon the gas pressure within the flow through compartment 28 of the main housing 20 being at or above a minimum acceptable gas flow pressure, the primary diaphragm 60 is urged, preferably upwardly so as to move and maintain the primary biasing means 62 into the compressed orientation. It is noted therefore that the strength of the primary biasing means 62, the resiliency or stiffness of the primary diaphragm 60, and/or the initial precompressed state of the primary biasing means 62 relative to the primary diaphragm 60, define the minimum acceptable gas flow pressure.

Further, included with the primary flow detection means is a primary lever displacement member 65. This primary lever displacement is specifically structured to engage the lever element 30, so as to overcome the lever biasing element 38 and urge the lever element 30 into the shut off orientation wherein the contact plate 35 is securely engaged with the magnetic element 36, and the stopper means 50 is thus disposed in covering relation atop the interior outlet port 46, upon the primary biasing means 62 being allowed to move into the relaxed orientation. In the preferred embodiment, the primary lever displacement member 65 includes an elongate rod, preferably connected through a center of the diaphragm 60 such as by a washer 64 or other securing element. As such, as the diaphragm 60 moves the primary lever displacement member 65 correspondingly moves. In use, a head portion 66 of the primary lever displacement member 65 extends into the flow through compartment 28 in directly overlying relation above the lever member 30. When sufficient gas pressure is exerted on the diaphragm 60 such that it is being urged towards the upper compartment 26, thereby compressing the primary biasing means 62, the head portion 66 is sufficiently spaced from the lever element 30 so as to have no affect thereon. When, however, the gas pressure within the flow through compartment 28 drops below the predetermined minimum acceptable gas flow pressure, the effects of the gas pressure are insufficient to hold up the primary diaphragm and maintain the primary biasing means in a compressed orientation such that the downward movement of the primary diaphragm results in corresponding downward movement of the primary lever displacement member 65 until its head portion 66 engages the elver element 30 and pushes it downwardly until the contact plate 35 comes into close enough relation with the magnetic element 36 such that they engage one another and maintain the lever element 30 in its shut off orientation. As viewed from the drawings, the head portion 66 of the primary lever displacement 65 may be structured to engage a pin 92, which will be described in greater detail hereafter, so as to downwardly move the lever element 30, or can equivalently be configured so as to directly engage the lever element 30 to urge it downwardly upon the gas pressure drop.

Additionally, in the preferred embodiment of the primary flow detection means, a low pressure indicator element 68 is preferably disposed on an end of the primary lever displacement 65 opposite its head portion 66. Normally, the low pressure indicator element 68 is exteriorly visible through the main housing 20 when the gas pressure within the flow through compartment of the main housing is at or above the predetermined minimum acceptable gas flow pressure. If, however, the low pressure indicator element 68 drops into the primary housing 20, it serves as an indication that the gas flow pressure has dropped below acceptable levels and/or that the gas flow has been shutoff. In addition to serving to indicate whether the gas flow pressure is above minimum acceptable levels, the low pressure indicator 68 also acts as an immediate gas flow shut off or "panic button". Specifically, when gas is flowing normally the low pressure indicator 68 protrudes from the primary housing 20. If, however, while gas is flowing a user needs to immediately shut off the gas, they can merely push down the low pressure indicator 68, thereby manually lowering the primary lever displacement member until it engages the lever element 30 and pushes it down into its shut off orientation.

Figure 2:
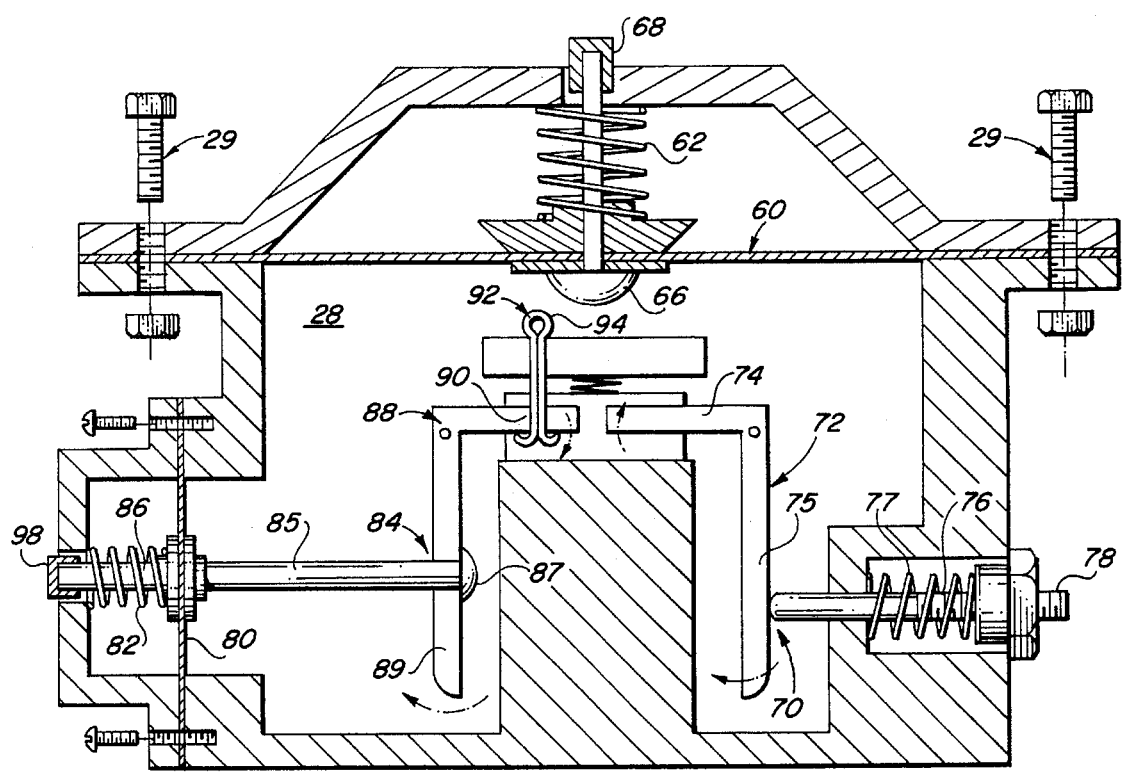
FIG. 2 is a side cross sectional view of the gas flow safety valve assembly of the present invention.

Turning to FIG. 2, the gas flow safety valve assembly 10 of the present invention also includes secondary flow detection means which are structured and disposed to detect gas flow pressures above a predetermined maximum acceptable gas flow pressure. In particular, the secondary flow detection means function to position the lever element 30 in its shut off orientation when the gas pressure within the flow through compartment 28 of the main housing 20 rises above the predetermined minimum acceptable gas flow pressure. As such, the secondary flow detection means include a secondary diaphragm 80 disposed in the flow through compartment 28 of the main housing 20. As illustrated in FIG. 2, the secondary diaphragm 80 is preferably disposed at a side, out of the way location of the main housing 20, but still in a location where it is able to react to a changing gas pressure flow through the main housing 20. The secondary diaphragm 80 is preferably formed of the same material construction as the primary diaphragm 60, and is fastened in place by a plurality of screws much like the primary diaphragm 60.

Connected with the secondary diaphragm 80 are secondary biasing means preferably in the form of a biasing spring 82. Much like the primary biasing means, the secondary biasing means 82 are structured to be moveable between a compressed orientation and a relaxed orientation. In the secondary flow detection means, however, the secondary biasing means 82 are of sufficient strength so as to be urged into and maintained in their compressed orientation only upon a gas pressure within the flow through compartment 28 of the main housing 20 rising to or above the predetermined maximum acceptable gas flow pressure. In particular, the secondary biasing means 82 are connected with the secondary diaphragm 80 such that when the gas pressure in the flow through compartment 28 rises sufficiently the displacement of the secondary diaphragm 80 is enough to compress the secondary biasing means 82.

Additionally, connected with the secondary diaphragm, in a similar fashion as the primary lever displacement member 65 is connected with the primary diaphragm 60, is a secondary lever displacement member 84. The secondary lever displacement 84 is specifically structured and disposed to engage the lever element 30 and overcome the lever biasing element 38 in order to urge the lever element 30 into its shut off orientation. Further, the lever element 30 is to be urged into the shut off orientation when the secondary diaphragm 80 is pushed sufficiently by a gas pressure increase within the flow through compartment 28 of the main housing 20 above the predetermined maximum acceptable gas flow pressure that results in compression of the secondary biasing means 82.

As best seen in FIG. 2, the secondary lever displacement member 84 includes a first a pivot member 88, pivotally disposed in the main housing. Preferably, this pivot member 88 has a generally L like configuration with a first end 90 structured to engage the lever element 30 and a second end 89 secured to the secondary diaphragm 80. To connect the pivot member 88 with the secondary diaphragm 80, an elongate rod 85 is disposed within the main housing 20. This elongate rod 85 includes one end 87 which extends through the second end 39 of the pivot member 88, and another end 86 which extends through the secondary diaphragm 80 and is secured therewith. Therefore, when the secondary diaphragm 80 is subjected to sufficient pressure to compress the secondary biasing means 82, the rod 85 is pulled away from the pivot member 88 so as to pivot the second end 89 of the pivot member 88 towards the secondary diaphragm 80. As a result of the pulled movement of the second end 89 of the pivot member 88, the first end 90 of the pivot member 88 moves downwardly, away from the lever element 30. Accordingly, a pin 92 is included and extends through the lever element 30. The pin 92, which has a generally wide head portion 94 that protrudes above the lever element 30, is structured to extend into engaged relation with the first end 90 of the pivot member 80. Therefore, upon downward movement of the first end 90 of the pivot member 88, the pin at 92 pulled downward until the head 94 of the pin 92 engages the lever member 30 to pull it downwardly into its shut off orientation. As previously recited, the head 94 of the pin 92 may also be structured to engage the head portion 66 of the primary lever displacement member 65 such that upon appropriate downward movement of the primary lever displacement member 65, the head 94 of the pin 92 is engaged and pushed downwardly so as to urge the lever member 30 into its shut off orientation.

A high pressure indicator element 98 is preferably included at the end 86 of the rod 85 of the secondary lever displacement member 84. Normally, the high pressure indicator element 98 is recessed within the main housing 20; however, upon the gas pressure rising above the predetermined maximum acceptable gas flow pressure so as to displace the secondary diaphragm 80 and compress the secondary biasing means 82, the high pressure indicator element 98 protrudes from the main housing 20 to indicate an overpressure situation, or an increase in pressure that approaches the overpressure situation wherein the maximum acceptable flow pressure is attained.

Finally, the gas flow safety valve assembly 10 of the present invention includes reset means. Specifically, the reset means are structured and disposed to separate the contact plate 35 of the lever element 30 from the magnetic element 36 so as to return the lever element 30 to its flow through orientation. In the preferred embodiment, the reset means 70 includes a reset member 72 pivotally disposed in the main housing 20. The reset member 72 preferably has a generally L type configuration including a first end 74 and a second end 75. Specifically, the first end 74 of the reset member 72 is structured to engage the lever element 30 so as to lift it and urge it into its flow through orientation. The second end 75 is structured to be exteriorly actuated by a user and thereby result in appropriate movement of the first end 74 of the reset member 72 into engaging relation with the lever member 30. Due to the generally L-shaped configuration of the reset member 72, and its pivotal engagement within the main housing 20, the second end 75 of the reset member 72 is structured to be pushed inwardly so as to urge the first end 74 of the reset member 72 upwardly into its engaging orientation. Accordingly, in the preferred embodiment an exteriorly exposed reset pin 76 is included. The reset pin 76, which is normally held in a disengaging orientation by a spring 77 or like biasing element and includes an exterior push button portion 78. As such, when the push button portion 78 is inwardly pushed by a user so as to overcome the resistance of the spring 77, it results in the reset pin 76 engaging the second end 75 of the reset member 72 and moving it inwardly until the first end 74 of the reset member 72 has moved upwardly to a sufficient extend to raise the lever element 30. The lever element 30 is raised until the contact plate 35 is separated from the magnetic element 36 and the lever biasing element 28 is able to maintain the lever element 30 in its flow through orientation despite the attraction between the contact plate and the magnetic element.

Accordingly, as can be seen from the previous descriptions, if gas flow is interrupted due to a low pressure situation, the primary flow detection means move the lever element 30 into its shut off orientation. When this occurs, only if the gas flow pressure has risen to acceptable levels wherein the primary flow detection means no longer engage the lever element 30, and the reset means 70 are engaged, will normal gas flow continue to operate. Additionally, if gas flow ceases due to a high pressure situation, only if the gas flow pressure has dropped below the dangerous levels, yet has remained above the minimum acceptable levels, and also if the reset means 70 are engaged, will normal gas flow return. Finally, if immediate, manual shut down has been directed such as by pushing the low pressure indicator 68 in a panic button type method, all appropriate operating conditions must be present and the reset means 70 must be engaged to resume normal gas flow. As a result, no matter the irregular pressure situation that has resulted in a gas flow stoppage, only if gas flow conditions are back to acceptable levels and if the user takes steps to affirmatively reset and reinitiate gas flow, presumably after determining that all interior appliances have been shut off and any extraneous operating conditions are in order, will gas flow resume in a normal fashion.

While this invention has been shown and described in what is considered to be a practical and preferred embodiment, it is recognized that departures may be made within the spirit and scope of this invention which should, therefore, not be limited except as set forth in the claims which follow and within the doctrine of equivalents.

Now that the invention has been described,
What is claimed is:

1. A gas flow safety valve assembly comprising:

a main housing, said housing being of generally solid, rigid construction and including a main interior chamber, primary flow detection means structured and disposed to detect a gas flow pressure through said main interior chamber of said main housing, said primary flow detection means including a primary diaphragm disposed in said main interior chamber and dividing said main interior chamber into a flow through compartment and an upper compartment, an inlet passage extending from an exterior inlet port formed in an exterior of said main housing to an interior inlet port leading to said flow through compartment of said main interior chamber, an outlet passage extending between an exterior outlet port formed in said exterior of said main housing to an interior outlet port leading to said flow through compartment of said main interior chamber, a lever element disposed in said flow through compartment, said lever element including a first end and a second end, said first end of said lever element being hingedly secured to said main housing, generally near said interior outlet port, a magnetic element disposed in said main housing near said interior inlet port, a contact plate disposed generally at said second end of said lever element in generally overlying relation above said magnetic element, said lever element including a shut off orientation and a flow through orientation, said shut off orientation including said contact plate being securely engaged with said magnetic element and said flow through orientation including said contact plate disposed in spaced apart relation from said magnetic element, a lever biasing element disposed in said main housing and extending into said flow through compartment of said main housing so as to engage said lever element and maintain said lever element normally in said flow through orientation, stopper means included in said lever element and structured to cover said interior outlet port upon said lever element being disposed in said shut off orientation and to expose said interior outlet port upon said lever element being disposed in said flow through orientation, said primary flow detection means further including primary biasing means connected with said primary diaphragm and being moveable between a compressed orientation and a relaxed orientation, said primary biasing means being structured and disposed to be urged into and maintained in said compressed orientation upon said gas pressure within said flow through compartment of said main housing being at or above a predetermined minimum acceptable gas flow pressure which urges said primary diaphragm towards said upper compartment of said main housing, said primary flow detection means also including a primary lever displacement member extending into said flow through compartment, said primary lever displacement member being structured to engage said lever element, so as to overcome said lever biasing element and urge said lever element into said shut off orientation wherein said contact plate is securely engaged with said magnetic element and said stopper means are accordingly disposed in covering relation atop said interior outlet port, upon said primary biasing means moving into said relaxed orientation due to said gas pressure within said flow through compartment of said main housing dropping below said predetermined minimum acceptable gas flow pressure, and reset means structured and disposed to separate said contact plate of said lever element from said magnetic element so as to position said lever element in said flow through orientation only if said gas pressure within said flow through compartment of said main housing is at or above said predetermined minimum acceptable gas flow pressure.

2. A gas flow safety valve assembly as recited in claim 1 wherein said primary flow detection means include a low pressure indicator element which is exteriorly visible from said main housing so as to indicate that said gas pressure within said flow through compartment of said main housing is at or above said predetermined minimum acceptable gas flow pressure.

3. A gas flow safety valve assembly as recited in claim 2 wherein said low pressure indicator is structured to be pushed into said main housing so as to result in immediate movement of said primary lever displacement member into engaging relation with said lever element, thereby immediately stopping gas flow through said main housing.

4. A gas flow safety valve assembly as recited in claim 1 wherein said stopper means includes a stopper element structured to engage said interior outlet port about a perimeter thereof, and a biasing spring structured and disposed to maintain a fluid impervious seal between said stopper element and said interior outlet port while said lever element is disposed in said shut off orientation.

5. A gas flow safety valve assembly as recited in claim 1 further including secondary flow detection means structured and disposed to position said lever element in said shut off orientation upon said gas pressure within said flow through compartment of said main housing rising above a predetermined maximum acceptable gas flow pressure.

6. A gas flow safety valve assembly as recited in claim 5 wherein said secondary flow detection means include a secondary diaphragm disposed in said flow through compartment of said main housing.

7. A gas flow safety valve assembly as recited in claim 6 wherein said secondary flow detection means further include secondary biasing means connected with said secondary diaphragm and moveable between a compressed orientation and a relaxed orientation, said secondary biasing means being urged into and maintained in said compressed orientation upon a gas pressure within said flow through compartment of said main housing being at or above a predetermined maximum acceptable gas flow pressure.

8. A gas flow safety valve assembly as recited in claim 7 wherein said secondary flow detection means also include a secondary lever displacement member structured and disposed to engage said lever element so as to overcome said lever biasing element and urge said lever element into said shut off orientation wherein said contact plate is securely engaged with said magnetic element and said stopper means are accordingly disposed in covering relation atop said interior outlet port, upon said secondary diaphragm moving so as to urge said secondary biasing means into said compressed orientation due to said gas pressure within said flow through compartment of said main housing rising to or above said predetermined maximum acceptable gas flow pressure.

9. A gas flow safety valve assembly as recited in claim 8 wherein said secondary lever displacement member includes a pivot member, pivotally disposed in said main housing and including a first end structured to engage said lever element and a second end secured to said secondary diaphragm such that said first end engages said lever element so as to urge it into said shut off orientation upon said secondary diaphragm moving so as to urge said secondary biasing means into said compressed orientation.

10. A gas flow safety valve assembly as recited in claim 9 wherein said secondary lever displacement means further include a pin extending through said lever element and secured with said first end of said pivot member.

11. A gas flow safety valve assembly as recited in claim 10 wherein said pivot member is generally L-shaped and is structured to pivot such that said first end moves away from said lever element, thereby pulling said pin and pulling said lever element into said shut off orientation, upon said second end of said pivot member being pulled by said secondary diaphragm.

12. A gas flow safety valve assembly as recited in claim 5 wherein said secondary flow detection means include a high pressure indicator element which is exteriorly visible from said main housing so as to indicate that said gas pressure within said flow through compartment of said main housing is at or above said predetermined maximum acceptable gas flow pressure.

13. A gas flow safety valve assembly as recited in claim 1 wherein said reset means include a reset member disposed in said main housing and having a first end structured and disposed to engage said lever element so as to urge said lever element into said flow through orientation and a second end structured and disposed to be exteriorly actuated in order to move said first end of said reset member into engaging relation with said lever member.

14. A gas flow safety valve assembly as recited in claim 13 wherein said reset member is generally L-shaped and is pivotally secured to said main housing such that said second end thereof is structured to be pushed by an exteriorly exposed reset pin in order to move said first end of said reset member upwardly to engage said lever member.

* * * * *